United States Patent
Matsuoka et al.

(10) Patent No.: US 7,551,320 B2
(45) Date of Patent: Jun. 23, 2009

(54) IMAGE PROCESSING APPARATUS, IMAGE FORMING APPARATUS, CONTROL PROGRAM, AND COMPUTER-READABLE RECORDING MEDIUM

(75) Inventors: Tomoe Matsuoka, Nara (JP); Tatsuya Tanaka, Yamatokoriyama (JP); Kyosuke Taka, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 351 days.

(21) Appl. No.: 11/514,211

(22) Filed: Sep. 1, 2006

(65) Prior Publication Data

US 2007/0052988 A1  Mar. 8, 2007

(30) Foreign Application Priority Data

Sep. 5, 2005  (JP)  ............................. 2005-257122

(51) Int. Cl.
*G06F 15/00* (2006.01)
(52) U.S. Cl. ........................................ 358/1.9; 358/518
(58) Field of Classification Search ................. 358/518, 358/1.9
See application file for complete search history.

(56) References Cited

U.S. PATENT DOCUMENTS

| | | | |
|---|---|---|---|
| 5,245,417 A | 9/1993 | Hibi et al. | |
| 6,064,494 A | 5/2000 | Hirota et al. | |
| 6,269,185 B1 * | 7/2001 | Takai | 382/167 |
| 6,369,913 B2 * | 4/2002 | Aoyagi et al. | 358/1.9 |
| 6,417,932 B1 | 7/2002 | Hirota et al. | |
| 6,621,944 B1 | 9/2003 | Takahagi et al. | |
| 6,816,618 B1 | 11/2004 | Imaizumi et al. | |
| 7,199,897 B2 * | 4/2007 | Nomizu | 358/1.18 |
| 2001/0002142 A1 | 5/2001 | Akiyama et al. | |
| 2001/0021042 A1 | 9/2001 | Hirota et al. | |
| 2004/0234135 A1 * | 11/2004 | Nomizu | 382/209 |
| 2005/0088692 A1 | 4/2005 | Imaizumi et al. | |

FOREIGN PATENT DOCUMENTS

JP  4-316273 A  11/1992

(Continued)

*Primary Examiner*—Twyler L. Haskins
*Assistant Examiner*—Michael Burleson
(74) *Attorney, Agent, or Firm*—Birch, Stewart, Kolasch & Birch, LLP

(57) ABSTRACT

An image processing apparatus of the present invention includes: a signal correction means which corrects, in an RGB color space, RGB tone data which is RGB image data; and a comparison section which compares (i) a tonal value of a white point which is neither an origin nor maximum tonal values of R, G, and B in the RGB color space, and where tonal values of R, G, and B are identical to one another, with (ii) respective tonal values of R, G, B of the RGB tone data. (A) In case where the tonal values of R, G, and B are determined to be larger than the white point, the signal correction means corrects the tonal values of R, G, and B to be close to the white point. (B) In case where the tonal values of R, G, and B of the RGB tone data is determined to be smaller than the white point, the signal correction section corrects they tonal values of R, G, and B of the RGB tone data to be away from the white point. As a result, undercolor processing is precisely executed while the color reproducibility in a highlight is maintained.

11 Claims, 8 Drawing Sheets

FOREIGN PATENT DOCUMENTS

| | | | | | | |
|---|---|---|---|---|---|---|
| JP | 7-74952 A | 3/1995 | | JP | 2004-201198 A | 7/2004 |
| JP | 11-252378 A | 9/1999 | | JP | 2005-33437 A | 2/2005 |
| JP | 1-296775 A | 11/1999 | | | | |

* cited by examiner

| RGB | R'G'B' |
|---|---|
| 255 | 239 |
| 250 | 239 |
| 245 | 238 |
| 240 | 237 |
| 235 | 235 |
| 230 | 226 |
| 225 | 218 |
| 220 | 209 |
| 215 | 200 |
| 210 | 191 |
| 205 | 183 |
| 200 | 174 |
| 195 | 169 |
| 190 | 165 |
| 185 | 161 |
| 180 | 156 |
| 128 | 111 |
| 64 | 56 |
| 1 | 1 |

| R | G | B |
|---|---|---|
| 248 | 235 | 238 |
| R' | G' | B' |
| 239 | 235 | 237 |
| Y | M | C |
| 0 | 1 | 0 |

| R | G | B |
|---|---|---|
| 220 | 220 | 220 |
| R' | G' | B' |
| 209 | 209 | 209 |
| Y | M | C |
| 6 | 6 | 6 |

FIG. 9

| R | G | B |
|---|---|---|
| 248 | 235 | 238 |
| Y | M | C |
| 1 | 4 | 3 |
| Y' | M' | C' |
| 0 | 3 | 2 |

FIG. 10

| R | G | B |
|---|---|---|
| 220 | 220 | 220 |
| Y | M | C |
| 7 | 7 | 7 |
| Y' | M' | C' |
| 6 | 6 | 6 |

IMAGE PROCESSING APPARATUS, IMAGE FORMING APPARATUS, CONTROL PROGRAM, AND COMPUTER-READABLE RECORDING MEDIUM

This Nonprovisional application claims priority under 35 U.S.C. § 119(a) on Patent Application No. 257122/2005 filed in Japan on Sep. 5, 2005, the entire contents of which are hereby incorporated by reference.

FIELD OF THE INVENTION

The present invention relates to an image processing apparatus which performs an undercolor process based on supplied RGB tone data.

BACKGROUND OF THE INVENTION

Various types of documents can now be duplicated thanks to the improvement in photocopiers. Even color documents, photos, and documents in which images are formed on various types of paper can be almost perfectly duplicated.

For example, a process after reading out a document is different between a case where a document in which an image is formed on a piece of normal paper is duplicated and a case where a document in which an image is formed on a piece of photo paper is duplicated. More specifically, performed after reading out a document is a process (an undercolor process) corresponding to the property of paper which is the base of a document. Color photocopiers preferably perform so-called undercolor removal by which, for example, the color of a document slightly tinged with yellow is converted to "white". On this account, to perform an undercolor process, it is necessary to detect the undercolor level at the time of reading out a document.

In conventional color photocopiers, the detection of the undercolor level is typically carried out by pre-scanning (rough scanning which is carried out before the actual image scanning and is several times faster than the actual image scanning). By this pre-scanning, the type of the document (color or monochrome) and the undercolor level are detected. Therefore, in the actual image scanning for reading out an image, it is possible to start image output immediately after the completion of the image readout.

The aforesaid method for detecting the undercolor level by pre-scanning, however, has such a problem that the speed of duplication is slow because of a time required for pre-scanning.

To solve this problem, for example, there have been techniques proposed by Patent Document 1 (Japanese Laid-Open Patent Application No. 2000-232589; published on Aug. 22, 2000) and Patent Document 2 (Japanese Laid-Open Patent Application No. 1-296775; published on Nov. 30, 1989).

To be more precise, according to Patent Documents 1 and 2, an undercolor process is carried out based on image data obtained by the image scanning (original readout), without performing pre-scanning.

According to the technique disclosed in Patent Document 1, RGB tone data obtained by scanning a document is converted to Lab image data. The undercolor is detected based on the Lab image data, the Lab image data is converted to CMYK image data, and then an undercolor process is carried out using the CMYK image data.

According to the technique disclosed in Patent Document 2, the density histogram of RGB tone data obtained by scanning a document is figured out. Based on this density histogram, a predetermined tonal value is subtracted from the RGB data, so that an undercolor process is achieved.

The aforesaid conventional techniques, however, do not take account of the color reproducibility in a highlight, and have poor precision in undercolor removal.

More specifically, an undercolor process in Patent Document 1 is carried out using CMYK image data. Since CMYK image data is typically obtained by calculating natural logarithms of RGB image data, undercolor removal using CMYK image data is not precise.

In the meanwhile, according to Patent Document 2, since a particular proportion of RGB tone data is subtracted, undercolor removal is excessive in some cases.

In addition to the above, Patent Documents 1 and 2 merely carry out an undercolor process, without considering the color reproducibility in a highlight. In connection with this, CMYK image data is obtained by figuring out natural logarithms of RGB image data. On this account, in the highlight, even if RGB tonal values are greatly different between neighboring images, this difference between the images becomes not evident after the conversion to CMYK image data.

Meanwhile, Patent Document 3 (Japanese Laid-Open Patent Application No. 4-316273; published on Nov. 6, 1992) discloses an image processing apparatus which generates CMYK four-color signal in such a manner that black components of a target pixel and adjacent pixels are smoothed based on a black component extracted from CMY three-color image signal, and undercolor removal is carried out based on the smoothed black components.

Patent Document 4 (Japanese Laid-Open Patent Application No. 5-207280; published on Aug. 13, 1993; corresponding to U.S. Pat. No. 5,245,417) discloses a method of calculating correction data by approximating the detected undercolor level of a document by a linear function.

Patent Document 5 (Japanese Laid-Open Patent Application No. 8-186726; published on Jul. 16, 1996; corresponding to U.S. Pat. No. 6,064,494) discloses an image processing apparatus which detects the undercolor level of a document based on a density histogram, and corrects RGB image data supplied to image forming means in such a manner that the undercolor level of an image formed on a sheet by the image forming means is identical with a predetermined level.

Patent Document 6 (Japanese Laid-Open Patent Application No. 2004-201198; published on Jul. 15, 2004) discloses a method of carrying out undercolor removal in such a manner that a peak point based on which undercolor is determined is worked out, and correction to white (maximum tone) is performed if the peak point thus worked out is not white.

The color reproducibility in a highlight is not considered in these prior art documents, either.

SUMMARY OF THE INVENTION

The present invention was done in consideration of the above-identified problem. The objective of the present invention is to provide an image processing apparatus which can precisely carry out undercolor processing while keeping the color reproducibility in a highlight.

To achieve this objective, the image processing apparatus of the present invention includes: correction means for correcting, in an RGB color space, RGB tone data which is RGB image data; and comparison means for comparing (i) a tonal value of a white point which is neither an origin nor maximum tonal values of R, G, and B in the RGB color space, and where tonal values of R, G, and B are identical to one another, with (ii) tonal values of R, G, B of the RGB tone data, the correction means correcting the RGB tone data in such a manner that: (A) among the tonal values of R, G, and B, a tonal value which is determined to be larger than the tonal value of the white point is corrected to be close to the tonal value of the white point, and (B) among the tonal values of R, G, and B, a tonal value which is determined to be smaller than the tonal value of the white point is corrected to be away from the tonal value of the white point.

The white point is also known as a highlight point, and indicates a tonal value of undercolor. The white point is used for an undercolor process. The undercolor process is carried out with the assumption that the tonal value indicated by the white point is the tonal value of the base.

According to the arrangement above, in case where, according to the comparison by the comparison means, supplied RGB tone data is larger than the white point, the correction means determines that the image indicated by the RGB tone data is a base. To carry out undercolor removal, the correction means corrects the tonal value of the RGB tone data in such a manner as to cause the tonal value to be close to a predetermined white point.

On the other hand, in case where, according to the comparison by the comparison means, supplied RGB data is smaller than the white point, the correction means determines that the image indicated by the RGB tone data is an image in a highlight. To clarify the image in the highlight, the tonal value of the RGB tone data is corrected so as to be away from a predetermined white point.

That is, according to the arrangement above, the correction of the image in the base and the correction of the image in the highlight region are carried out so as to be independent from each other, in accordance with the comparison between the tonal data of the RGB tone data and the white point.

This makes it possible to improve the color reproducibility in the highlight, while fog in the base is restrained.

The comparison of the R, G, and B tonal values with the white point, which is performed by the comparison means, is carried out in such a manner that the tonal values of R, G, and B are compared with the tonal value of the white point (R, G, and B have the same tonal value), respectively. Based on the comparison results produced by the comparison means, the correction means corrects the tones of R, G, and B.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9 is a table showing a history of undercolor removal performed against an RGB signal in a highlight, according to a conventional typical method.

FIG. 10 is a table showing a history of conversion of an RGB signal in a highlight, according to a conventional typical method.

DESCRIPTION OF THE EMBODIMENTS

The following will describe an embodiment of the present invention. An image processing apparatus of the present embodiment, for example, is included in an image forming apparatus, and corrects an RGB signal obtained by a document reading section in the image forming apparatus.

More specifically, the image processing apparatus carries out clarification of a highlight and undercolor removal, based on an RGB signal.

First, the image forming apparatus including the image processing apparatus of the present embodiment will be discussed.

Figure 2:
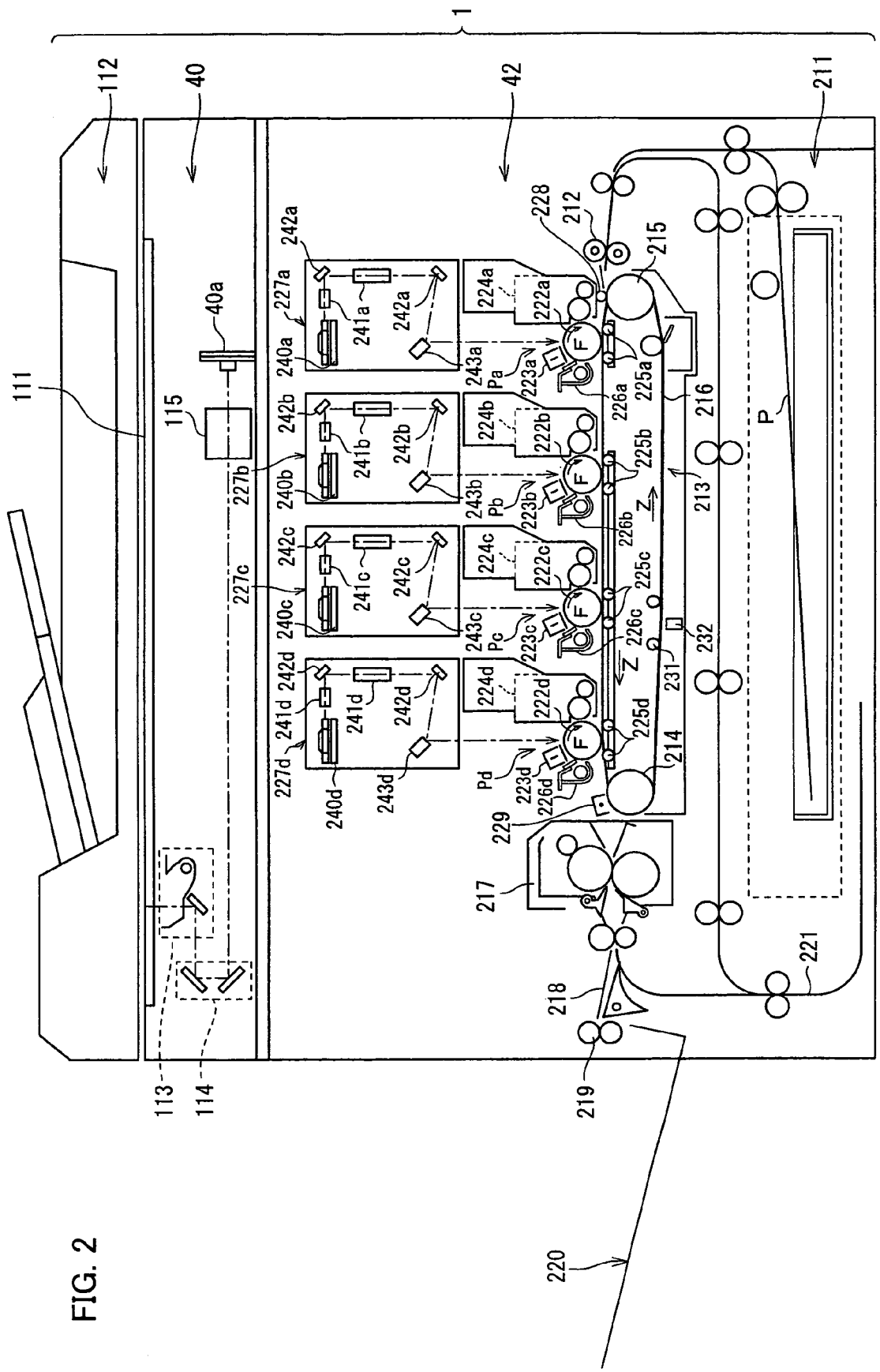
FIG. 2 is a cross section of a digital color photocopier which is an image forming apparatus of the embodiment of the present invention.

FIG. 2 is a cross section showing a digital color photocopier (hereinafter, color photocopier) 1 which is an image forming apparatus of the embodiment of the present invention. This color photocopier 1 has a function to set a printing mode. The color photocopier 1 performs printout corresponding to a printing mode which is set by the user or automatically set. Specific examples of the printing modes include a mode in which tone processing corresponding to the type of a document image (text image, photo image, image in which texts and images are mixed, FAX image such as G3) is executed so that printout is carried out. More specifically, in accordance with the types of document images, there are a text mode, a photo mode, a text/photo mix mode, a FAX mode, and so on.

The color photocopier 1 is one example of the image forming apparatus. Other examples include a monochrome photocopier, a printer, a facsimile machine, and a multifunction device which can function as these devices. The present invention can also be applied to such image forming apparatuses.

As shown in FIG. 2, on the upper surface of the color photocopier 1, a document supporter 111 and a below-mentioned operation panel are provided. In the color photocopier 1, a document reading section 40 and an image forming section 42 are provided.

On the upper surface of the document supporter 111, a reversing automatic document feeder (RADF) 112 is provided. The reversing automatic document feeder 112 is supported in such a manner as to be openable/closable with respect the document supporter 111, and supplies a document to a predetermined position on the surface of the document supporter 111.

The reversing automatic document feeder 112 transports a document in such a manner that one of the surfaces of the document is placed in a predetermined position (where the surface faces the document reading section 40) of the document supporter 111, and reads out an image on that surface of the document. After finishing the readout, the reversing automatic document feeder 112 reverses the document and transports the document in such a manner that the other one of the surfaces of the document is placed in a predetermined position (where the surface faces the document reading section 40) of the document supporter 111. The reversing automatic document feeder 112 ejects the document after finishing the readout of images on the both surfaces of the document, and then executes the double-side transportation for the next document. The document transportation and reversing by the reversing automatic document feeder 112 are controlled in association with the overall operation of the color photocopier 1.

The document reading section 40 reads out an image formed on a document. To read out an image on a document transported to the document supporter 111 by the reversing automatic document feeder 112, the document reading section 40 is provided below the document supporter 111. The document reading section 40 includes: document scanners 113 and 114 which horizontally move to and fro along the bottom surface of the document supporter 111; an optical lens 115; and a color CCD (imaging means) 40a which is a photoelectric transducer element.

The document scanners 113 and 114 are constituted by a first scanning unit 113 and a second scanning unit 114. The first scanning unit 113 includes an exposure lamp which exposes the surface of a document image to light and a first mirror which deflects a reflected. document image to a predetermined direction. The first scanning unit 113 horizontally moves to and fro at a predetermined scanning speed, with a predetermined distance from the bottom surface of the document supporter 111 being kept. The second scanning unit 114 includes second and third mirrors which deflect, to a predetermined direction, the reflected document image deflected by the first mirror of the first scanning unit 113. The second scanning unit 114 horizontally moves to and fro, at a constant speed with respect to the first scanning unit 113.

The optical lens 115 reduces the size of the reflected document image deflected by the third mirror of the second scanning unit, and provides the reduced optical image at a predetermined position on the color CCD 40a.

The color CCD 40a serially subjects the provided images to photoelectric conversion and outputs resultant electric signals. The color CCD 40a is a three-line color CCD which reads out a monochrome image or a color image, and outputs line data in which the image is separated into R (red), G (green), and B (blue) color components. The document image information, which is an electric signal converted by the color CCD 40a, is transferred to an image processing section which will be described later. The image processing section subjects the document image information to predetermined image data processing.

The following will describe the image forming section 42 and the components associated with the image forming section 42.

Below the image forming section 42, a paper feeding mechanism 211 is provided. This paper feeding mechanism 211 takes out one of the sheets (recording medium) P stacked in a paper tray, and supplies the sheet toward the image forming section 42. The sheet P which is supplied one by one is transported to the image forming section 42, under the timing control by a pair of resist rollers 212 provided on the path toward the image forming section 42. The sheet P, on one of the surfaces of which an image is formed, is again supplied to the image forming section 42, in accordance with the timing when the image forming section 42 forms an image.

Below the image forming section 42, a transfer belt mechanism 213 is provided. The transfer belt mechanism 213 transfers the sheets P as follows: a transfer belt 216 is provided between a driver roller 214 and a driven roller 215 in a horizontal manner, and a sheet P is electrostatically attached to the transfer belt 216 and transferred thereon. In addition to the above, a pattern image detection unit is provided in proximity to the lower side of the transfer belt 216.

At the downstream of the transfer belt mechanism 213 on the sheet feeding path, a fixing device 217 is provided. This fixing device 217 is used for fixing, to a sheet P, a toner image which has been transferred to the sheet P. The sheet P passes through the nip between a pair of fixing rollers of the fixing device 217, and then passes through a transportation direction switching gate 218. Thereafter the sheet P is ejected, by an ejection roller 219, onto a paper ejection tray 220 which is provided on the outer surface of the main body of the color photocopier 1.

The switching gate 218 switches the transportation path of the sheets P after the fixation, between the path through which the sheets P are ejected to the main body of the color photocopier 1 and the path through which the sheets P are supplied to the image forming section 42 again. After the transportation direction of the sheet P is switched toward the image forming section 42 by the switching gate 218, the sheet P is reversed by the switchback transportation path 211 (221), and is then supplied to the image forming section 42 again.

Above the transfer belt 216 of the image forming section 42, the following members are provided in proximity to the transfer belt 216: a first image forming station Pa, a second image forming station Pb, a third image forming station Pc, and a fourth image forming station Pd. These image forming stations are provided in this order, and the first image forming station Pa is at the most upstream of the paper transportation path.

The transfer belt 216 is moved by friction in the Z direction in FIG. 2, by the driving roller 214. As described above, the transfer belt 216 supports the sheets P which are supplied by the paper feeding mechanism 211, and serially transports the sheets P to the image forming stations Pa-Pd.

The image forming stations Pa-Pd are substantially identical with each other in terms of structure. The image forming stations Pa, Pb, Pc, and Pd include respective photosensitive drums 222a, 222b, 222c, and 222d which are rotated in the direction F in FIG. 2.

Around the photosensitive drums 222a-222d, the following members are provided in order, along the rotation direction of the photosensitive drums 222a-222d: charger 223a, 223b, 223c, and 223d which uniformly charge the respective photosensitive drums 222a-222d; developing devices 224a, 224b, 224c, and 224d which develop electrostatic images formed on the respective photosensitive drums 222a-222d; transfer dischargers 225a, 225b, 225c, and 225d which transfer, to a sheet P, toner images formed on the respective photosensitive drums 222a-222d; and cleaning devices 226a, 226b, 226c, and 226d which remove toner remaining on the respective photosensitive drums 222a-222d.

Above the respective photosensitive drums 222a-222d, laser beam scanning units (hereinafter, LSUs) 227a, 227b, 227c, and 227d are provided. The LSUs 227a-227d are constituted by: semiconductor laser elements (not illustrated) emitting dot light modulated in accordance with image data; polygon mirrors (deflecting devices) 240a-240d each of which is used for deflecting a laser beam, which is supplied from a semiconductor laser element, to the main scanning direction; an fθ lens 241 which focuses the laser beams, which have been deflected by the polygon mirrors 240*a*-240*d*, on the surfaces of the photosensitive drums 222*a*-222*d*; mirrors 242*a*-242*d* and 243*a*-243*d*; and so on.

The LSU 227*a* receives a pixel signal corresponding to a black color component of a color document image. LSU 227*b* receives a pixel signal corresponding to a cyan color component of the color document image. The LSU 227*c* receives a pixel signal corresponding to a magenta color component of the color document image. The LSU 227*d* receives a pixel signal corresponding to an yellow color component of the color document image.

With the arrangement above, electrostatic latent images corresponding to the document image information having been subjected to the color conversion are formed on the respective photosensitive drums 222*a*-222*d*. The developing device 224*a* stores black (K) toner, the developing device 224*b* stores cyan (C) toner, the developing device 224*c* stores magenta (M) toner, and the developing device 224*d* stores yellow (Y) toner. The electrostatic latent images on the photosensitive drums 222*a*-222*d* are developed using these toners with the respective colors. As a result, a toner image with these colors is generated from the document image information having been subjected to color conversion by the image forming section 42.

Between the first image forming station Pa and the paper feeding mechanism 211, a sheet attaching charger 228 is provided. This attaching charger 228 electrically charges the surface of the transfer belt 216. A sheet P supplied from the paper feeding mechanism 211 is firmly attached to the surface of the transfer belt 216, and transported through the first to fourth image forming stations Pa-Pd, without any misalignment.

On the other hand, between the fourth image forming station Pd and the fixing device 217, a discharger 229 is provided substantially directly above the driving roller 214. This discharger 229 is charged with an alternating current which is used for separating, from the transfer belt 216, the sheet P which is electrostatically attached to the transfer belt 216.

In the above-described color photocopier 1, the sheets P are sheet-shaped paper. A sheet P is taken out from the paper feeding cassette and supplied to the guide of the paper transportation path of the paper feeding mechanism 211. Once the edge of the sheet P is detected by a sensor (not illustrated), the movement of the sheet P is temporarily stopped by a pair of resist rollers 212, based on a detection signal supplied from the sensor.

The sheet P is then supplied to the surface of the transfer belt 216 rotating in the Z direction in FIG. 2, in accordance with the timings of the operation of the image stations Pa-Pd. Since the transfer belt 216 is electrically charged by the absorbing charger 228 in a predetermined manner as above, the sheet P is stably transported through the image stations Pa-Pd.

Thereafter, the toner images with respective colors are formed in the respective image stations Pa-Pd, and these images are overlapped with one another on the surface supporting the sheet P which is electrostatically attached to the transfer belt 216 and transported by the same. After the transfer of the image (toner image) by the fourth image station Pd finishes, the sheet P is removed from the transfer belt 216 by a neutralization discharger, from the leading edge of the sheet. Then the sheet P thus removed is transported to the fixing device 217. Finally, the sheet P to which the toner image is fixed is ejected onto the paper ejection tray 220, through a paper ejection outlet (not illustrated).

In the example described above, the optical writing onto the photoconductor is carried out by scanning and exposure using a laser beam, by means of LSUs 227*a*-227*d*. Alternatively, for example, a writing optical system (LED head) constituted by a light emitting diode array and an imaging lens array may be used in place of the LSUs. The LED head is small in size as compared to the LSUs, and does not make a noise because the LED head has no movable parts. Therefore, the LED head is preferable for image forming apparatuses such as a tandem color photocopier which requires a plurality of optical writing units.

Figure 3:
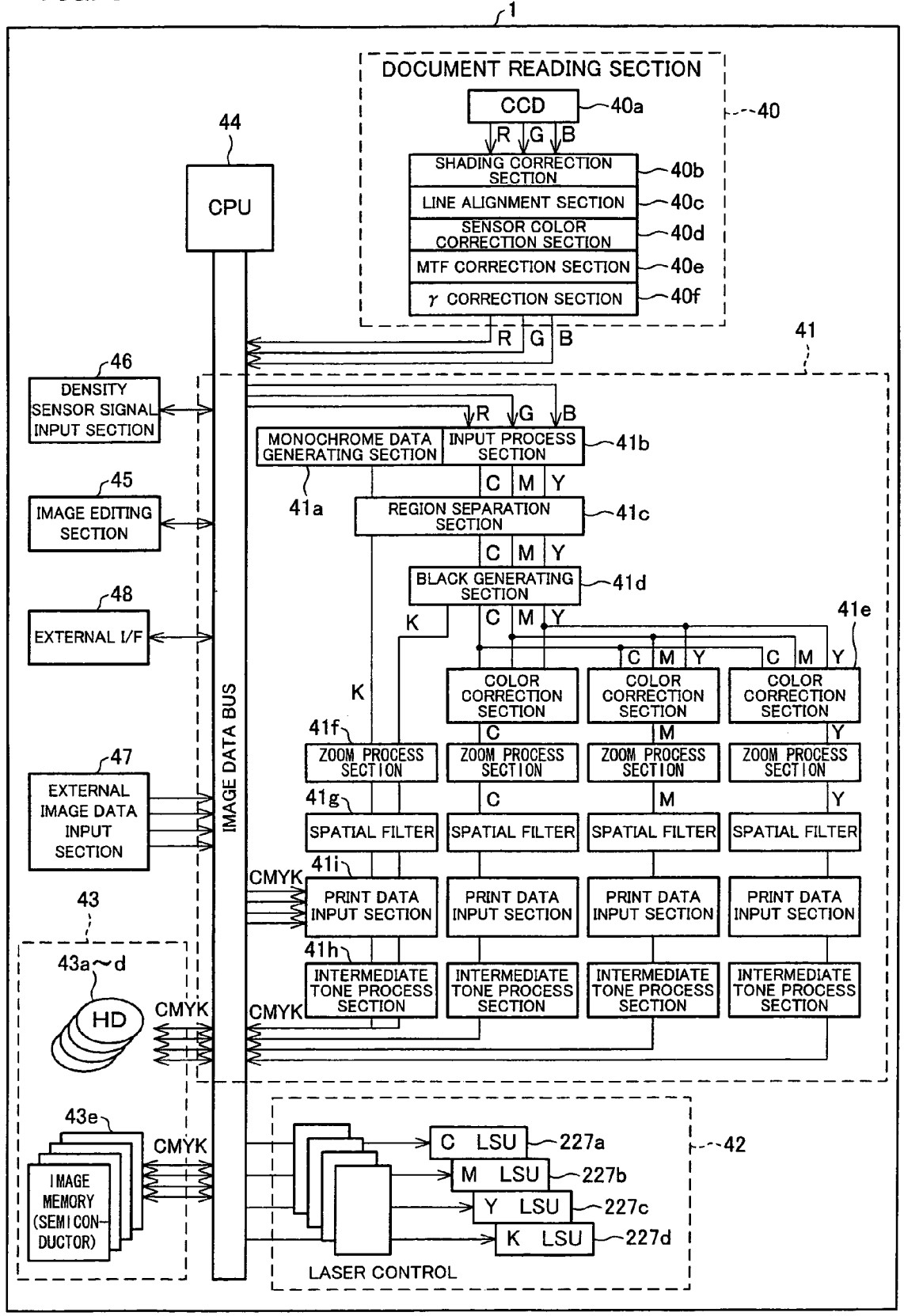
FIG. 3 is a block diagram for illustrating in what manner the color photocopier of FIG. 2 is controlled.

Referring to FIG. 3, in what manner the color photocopier 1 is controlled is outlined below. FIG. 3 is a block diagram for illustrating how the color photocopier 1 is controlled.

As shown in FIG. 3, the color photocopier 1 includes a document reading section 40, an image processing section 41, an image data storage section 43, an external image data input section 47, a density sensor signal input section 46, an image editing section 45, an external interface (external I/F) 48, an image forming section 42, a data storage section 43, and a CPU (central processing device) 44. These components are connected to a data bus and hence these components can perform data communication with one another.

The document reading section 40 reads out an image on a document. The external image data input section 47 receives image data transferred from an external device.

The CPU 44 centrally controls the above-described components, based on a predetermined sequence program.

The document reading section 40 includes a three-line color CCD 40*a*, a shading correction section (shading correction circuit, shading correction means) 40*b*, a line alignment section 40*c* (e.g. a line buffer), a sensor color correction section (sensor color correction circuit) 40*d*, an MTF correction section (MTF correction circuit) 40*e*, and a γ correction section (γ correction circuit) 40*f*.

The three-line color CCD 40*a* reads out an image from a monochrome document or a color document, and outputs sets of line data in which the image thus read out is separated into RGB color components. The shading correction section 40*b* corrects the line image levels of the sets of line data (corresponding to R, G, and B) of the document image read out by the color CCD 40*a*. The line alignment section 40*c* corrects the misalignment among the sets of line data of respective colors. The sensor color correction section 40*d* corrects the hues (color data) of the sets of line data of the respective colors. The MTF correction section (MTF correction circuit) 40*e* carries out correction in such a manner as to emphasize the variations of the signals of the respective pixels. The γ correction section 40*f* corrects the contrast of the image in order to improve visibility.

The image processing section 41 at least includes a monochrome data generating section 41*a*, an input process section 41*b*, a region separation section 41*c*, a black generating section 41*d*, a color correction section (color correction circuit) 41*e*, a zoom process section (zoom process circuit) 41*f*, a spatial filter 41*g*, an intermediate tone process section 41*h*, and a semiconductor processor (not illustrated) such as DSP, which executes the processes of the above-described components. In an arrangement where CMYK image data is supplied from an external device, the image processing section 41 further includes a print data input section 41*i* which receives CMYK image data. The print data input section 41*i* is provided between the process by the spatial filter 41*g* and the process by the intermediate tone process section 41*h*.

The monochrome data generating section 41*a* generates, when a monochrome copy mode is set, monochrome data from an RGB signal which is a color image signal supplied from the document reading section 40. The input process section 41b (i) converts an RGB signal supplied when a full-color copy mode is set into a YMC signal which is applicable to process units, of the image forming section 42, which correspond to respective colors Y (yellow), M (magenta), and C (cyan), and (ii) performs clock conversion. Details of the input process section 41b will be described later.

The following will briefly describe the steps of image processing performed in the image processing section 41 when the full-color copy mode is set.

The image data, which has been converted from the RGB signal to the YMC signal by the input process section 41b, is transferred to the region separation section 41c. In this region separation section 41c, the type (e.g. text, halftone printing, photographic printing) is determined, and then the image data is separated into regions based on the types of the images, such as a text region, halftone printing region, and a photographic printing region. Thereafter, as to the image data having been separated into the regions, a K (black) signal is generated based on the YMC signal of the image data, in the black generating section 41d (black generation process).

The image data of YMCK colors thus generated is supplied to the color correction section (color correction circuit) 41e on the subsequent stage. In the color correction section 41e, the print density is corrected so as to correspond to the density of an input image supplied from the document reading section 40, the external image data input section 47, or the external interface 48, based on density correction data corresponding to each printing mode (density correction process). The density correction process is carried out for each of YMCK colors. On this account, the density correction data for one printing mode includes each-color density correction data corresponding to all YMCK colors of the image. The density correction data is stored in a density correction data storage section (not illustrated) in the color correction section 41e.

The density correction data stored in the density correction data storage section is updated (corrected) at a predetermined timing. That is, new density correction data is generated, and the current density correction data stored in the density correction data storage section is replaced by the newly-generated density correction data. This update process is carried out to solve such a problem that the density of a printed image, which is printed based on the image data after the density correction process, no longer matches the density of an input image (e.g. document image), because of various reasons such as the change over time of the photosensitive property of the photosensitive drum 222 (see FIG. 2) of the image forming section 42, or the variation of an ambient temperature.

The image data which has been subjected to the density correction process in the color correction section 41e is then subjected to a magnification change process in the zoom process section (zoom process circuit) 41f on the subsequent stage. The magnification change process corresponds to magnification which is set by the user in advance. Thereafter, a filtering process by the spatial filter 41g is carried out, and then the intermediate tone process section 41h performs an intermediate tone process to reproduce tones. Examples of the intermediate tone process includes multivalued error diffusion and multivalued dithering.

The image data having been subjected to the processes by the components of the image processing section 41 is stored in the image data storage section 43. The image data storage section 43 serially receives sets of image data with 8 bits for each of YMCK colors (i.e. 32 bits in total), which are serially supplied from the image processing section 41. The image data storage section 43 temporarily stores the supplied image data in a buffer (not illustrated). The 32-bit image data, which is temporarily stored in the buffer, is read out in the order in which the data is stored, and then converted to sets of 8-bit image data corresponding to respective four colors. Thereafter the respective sets of 8-bit image data are stored in four hard disc (rotational storage medium) 43a, 43b, 43c, and 43d which correspond to the respective colors.

At timings when the sets of 8-bit image data of four colors, which are stored in the hard discs 43a-43d are supplied to the below-mentioned LSUs 227 of the image forming section 42, the sets of image data of the respective colors are temporarily stored in a buffer memory 43e (semiconductor memory), and are supplied, at different timings, to the respective LSUs 227 (227a-227d) corresponding to the respective YMCK colors. As a result of this, it is possible to compensate the difference between output timings, which is caused because the LSUs 227 are provided at different positions, and hence images which are serially transferred to the intermediate transfer belt are not misaligned.

The external interface (external I/F) 48 is communication interface means which is connected to the color photocopier 1 and is used for receiving image data from an image input processing device such as a communication mobile terminal, a digital camera, a digital video camera, or the like. The image data supplied from the external I/F 48 is also converted so as to have a data level suitable for image formation in a process unit in the color photocopier 1. This conversion is carried out in such a manner that the image data is temporarily stored in the image processing section 41 and subjected to the aforesaid density correction process, the intermediate tone process, and the like.

The external image data input section 47 is a printer interface or a FAX interface which receives image data generated by a facsimile machine or an information processing device such as a personal computer, which device is externally connected to the color photocopier 1 via a network or the like. The image data supplied from the external image data input section 47 has already been converted to a YMCK signal to which the aforesaid density correction process, magnification change process, the filtering process or the like has been carried out. On this account, after being supplied only to the intermediate tone processing section 41h, the image data is stored in and managed by the hard discs 43a, 43b, 43c, and 43d of the image data storage section 43.

The image editing section 45 carries out a predetermined image editing process against image data stored in the hard discs 43a-43d. The image data has been transferred to (or inputted to) the image data storage section 43 via the external image data input section 47, the image processing section 41, or the external I/F 48. The image editing process is performed in a virtual drawing region on a memory (not illustrated) for image synthesis. The buffer memory 43e of the image data storage section 43 may be used as the memory for image synthesis.

Figure 1:
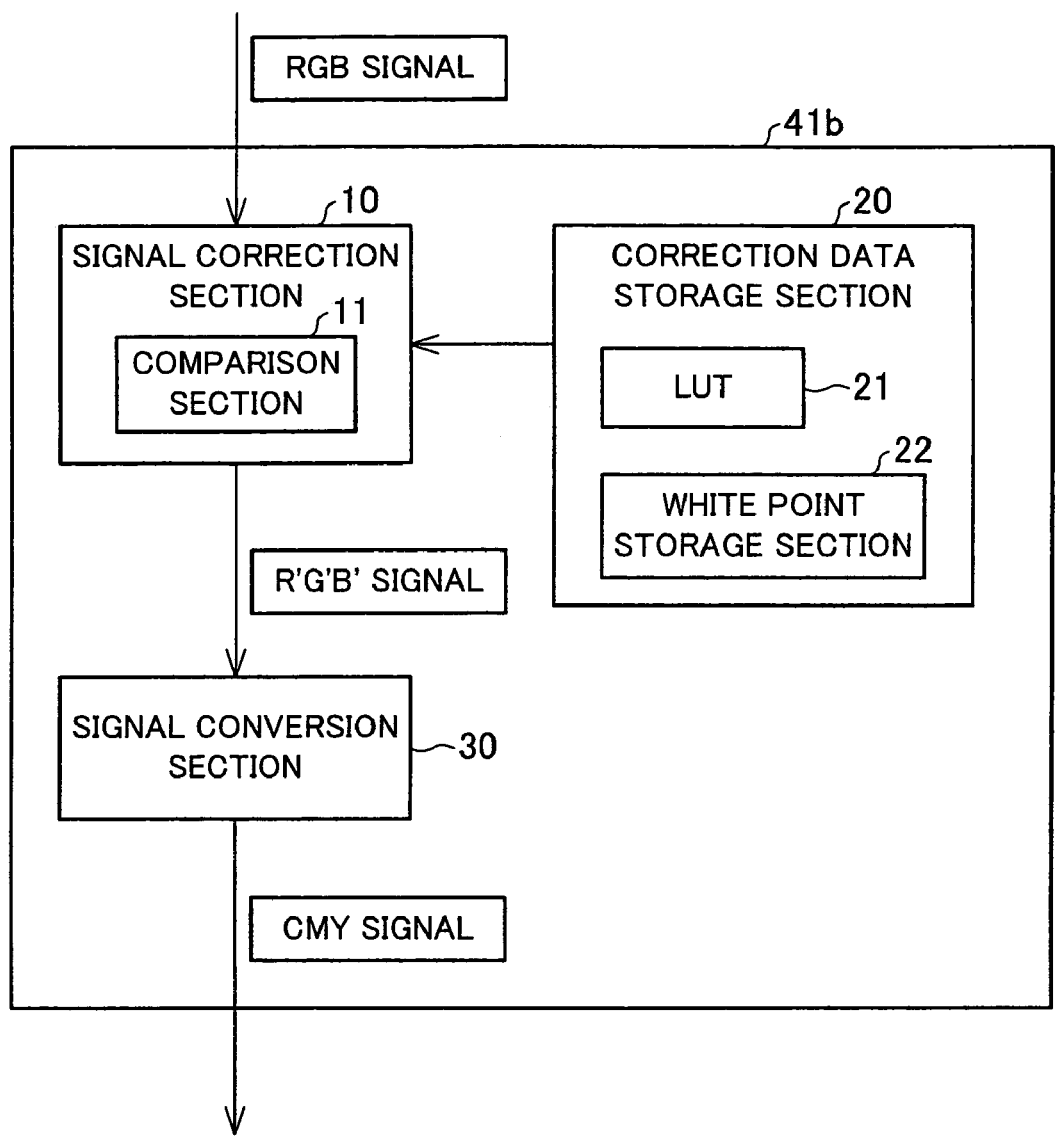
FIG. 1 is a block diagram showing an input process section of an embodiment of the present invention.

Now, details of the input process section 41b in the image processing section 41 of the present embodiment will be given. FIG. 1 is a block diagram showing the input process section 41b of the present embodiment.

Based on the supplied RGB signal, the input process section 41b simultaneously carries out the undercolor removal and a clarification process to clarify a highlight. The input process section 41b converts the RGB signal (which will be referred to as R'G'B' signal for convenience), which has been subjected to the undercolor removal and the clarification process, into a CMY signal.

More specifically, as shown in FIG. 1, the input process section 41b includes a signal correction section (correction means) 10, a correction data storage section 20, and a signal conversion section (signal conversion means) 30.

To perform the undercolor removal and the clarification process for the input process section 41b, the signal correction section 10 subjects the supplied RGB signal to a correction process. More specifically, the signal correction section 10 converts the supplied RGB signal into an R'G'B' signal, in reference to the correction data storage section 20.

The correction data storage section 20 stores data required for the conversion of the RGB signal into the R'G'B' signal by the signal correction section 10. Specific arrangements of the signal correction section 10 and the correction data storage section 20 and the details of the correction process will be described later.

The signal conversion section 30 converts the R'G'B' signal into a CMY signal. More specifically, the signal conversion section 30 carries out the conversion based on the equations (1)-(3) below. The conversion using the equations below is carried out in case where the R'G'B' signal is processed with 8 bits (256 tones). Indicated by A in the equations is a constant.

$$C = -A \log(R'/255) \quad (1)$$

$$M = -A \log(G'/255) \quad (2)$$

$$Y = -A \log(B'/255) \quad (3)$$

In this manner, the signal conversion section 30 converts the R'G'B' signal into a CMY signal.

If required, the CMY signal to be outputted or the supplied RGB signal (or may be the R'G'B' signal) may be subjected to a clock conversion process, in the input process section 41b.

The following will describe a conversion method (correction method), i.e. in what manner the RGB signal is converted into he R'G'B' signal in the signal correction section 10 of the present embodiment. First, how the correction data storage section 20 is structured is discussed.

The correction data storage section 20 includes an LUT (Look Up Table) 21 and a white point storage section 22.

The LUT 21 is a table which records in what manner the RGB signal and the R'G'B' signal correlate with one another. The white point storage section 22 stores a white point which is set in advance.

The white point is also known as a highlight point, and indicates a tonal value of undercolor. The white point is used for the undercolor removal. More specifically, for example, in case where an image formed on a piece of paper (document) is optically read out by the document reading section 40, an obtained RGB signal varies in line with the type of the paper. To cancel out the influence of the paper, the undercolor removal is carried out using the white point. The white point is appropriately set in accordance with, for example, the characteristic of the color CCD 40a of the document reading section 40.

The tonal value indicated by the white point does not change among R, G, and B. In the present embodiment (i.e. in case where the supplied RGB signal has 8 bits), the white point is a value which is neither the origin (0, 0, 0) nor the maximum tonal value (255, 255, 255) of the RGB color space. In the present embodiment, the white point is set at RGB= (235, 235, 235). Hereinafter, "white point" indicates a tonal value indicated by the white point.

The signal correction section 10 converts the supplied RGB signal into an R'G'B' signal, in reference to the LUT 21 and the white point storage section 22. More specifically, the signal correction section 10 includes a comparison section 11. The correction method is changed in accordance with a comparison result produced by the comparison section 11.

The comparison section 11 compares tonal values of the supplied RGB signal with the white point. More specifically, the comparison section 11 determines whether or not each of the tonal values of the R signal, G, signal, and B signal of the RGB signal is larger than the white point (235).

The signal correction section 10 determines the correction method based on the comparison result of the comparison section 11. More specifically, the signal correction section 10 operates as follows: (A) among the R, G, and B tonal values of the RGB signal (RGB tone data), a tonal value which is determined to be larger than the white point is corrected so as to be close to the white point so that an R'G'B' signal is generated; (B) as to a tonal value which is determined to be smaller than the white point, the value is corrected so as to be away from the white point so that an R'G'B' signal is generated. Also, the signal correction operates as follows: (C) as to a tonal value which is identical with the white point among the R, G, and B tonal values of the RGB tone data, an R'G'B' signal whose tonal value is identical with the supplied RGB signal is generated. More specifically, the signal correction section 10 converts the RGB signal to the R'G'B' signal, in reference to the LUT 21 which is the table that takes into account of the conditions (A), (B), and (C).

Details of the conditions (A), (B), and (C) will be given.

Figures 4, 5:
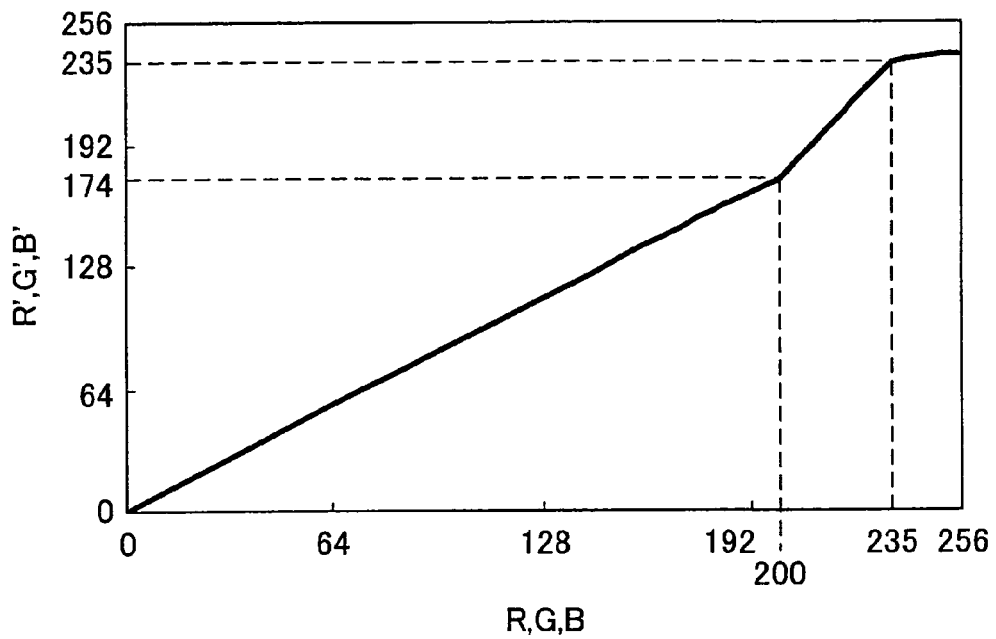
FIG. 4 is a graph for illustrating the relationship between an RGB signal and an R'G'B' signal.
FIG. 5 is a table for showing how the RGB signal and the R'G'B' signal correlate with one another.

FIG. 4 is a graph illustrating the relationship between the RGB signal and the R'G'B' signal. As shown in the figure, the tonal value of the R'G'B' signal (hereinafter, R'G'B' signal value) is corrected by the signal correction section 10 so as to be varied in line with the tonal value of the supplied RGB signal (hereinafter, RGB signal value). More specifically, which equation is used for the conversion is determined in line with the RGB signal.

In case where the RGB signal value is in the range of 0 to 200, the signal correction section 10 generates the R'G'B' signal value, based on the following equation (4).

$$R' = (174/200) \times R (0 \leq R \leq 200) \quad (4)$$

It is noted that G' and B' are also worked out in the same way.

In case where the RGB signal value is in the range of 200 to 235, the signal correction section 10 generates the R'G'B' signal value, based on the following equation (5).

$$R' = 235 - (235 - R) \times 1.75 (200 < R \leq 235) \quad (5)$$

It is noted that G' and B' are also worked out in the same way.

In case where the RGB signal value is in the range of 235 to 255, the signal correction section 10 generates the R'G'B' signal value, based on the following equation (6).

$$R' = 0.1 \times R + 213.5 (235 < R \leq 255) \quad (6)$$

It is noted that G' and B' are also worked out in the same way.

FIG. 5 shows a table indicating how the RGB signal and the R'G'B' signal correlate with one another. In case where the R'G'B' signal is generated based on the above-described equations (4)-(6), the result is shown in the table in FIG. 5.

In this manner, the signal correction section 10 changes the degree of correction, in accordance with the supplied RGB signal value. More specifically, based on the result of the determination of whether or not the supplied RGB signal value is larger than the white point, the signal correction section 10 generates an R'G'B' signal which is generated by correcting the RGB signal in such a manner as to cause the RGB signal value to be close to the white point, if the RGB signal value is larger than the white point. If the supplied RGB signal value is smaller than the white point, the signal correction section 10 generates an R'G'B' signal which is corrected in such a manner that the RGB signal value is caused to be away from the white point.

In case where the supplied RGB signal value is smaller than the white point and the RGB signal value is in a highlight region which is close to the white point, the signal correction section 10 generates an R'G'B' signal value which is worked out by correcting the RGB signal value in such a manner that, in the highlight region, the amplification degree of the R'G'B' signal value in comparison with the RGB signal value is larger than the amplification degree of the R'G'B' signal value in regions other than the highlight region.

Figures 6, 7, 8:
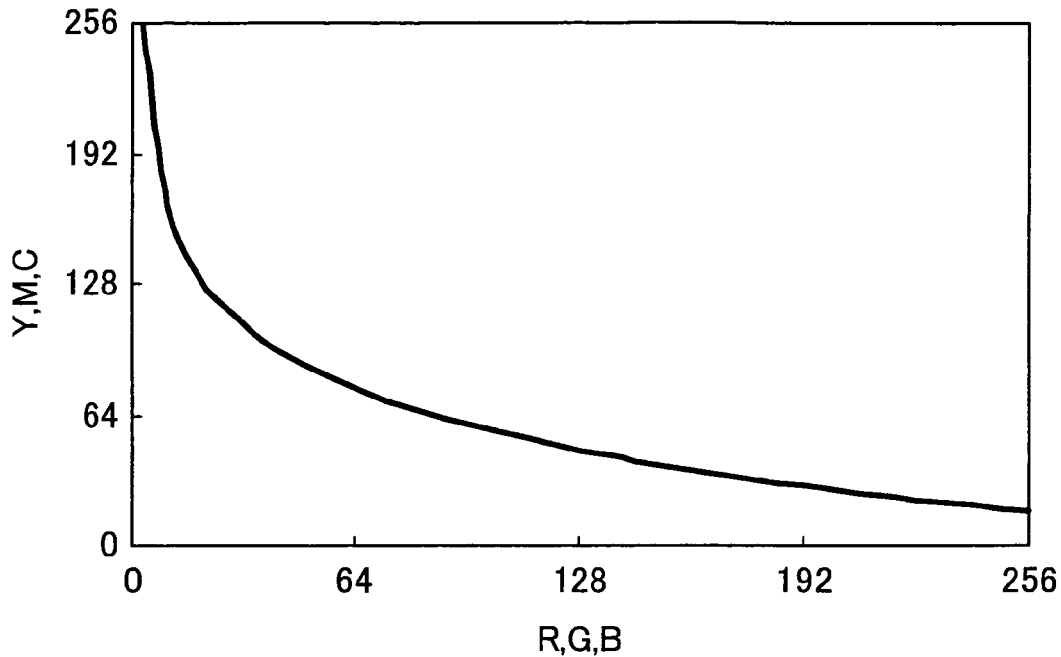
FIG. 6 is a graph for showing how the R'G'B' signal correlates with a CMY signal.
FIG. 7 is a table showing a history of undercolor removal which is performed against an RGB signal in an undercolor region (in which the RGB signal is above a highlight point (235)), according to an embodiment of the present invention.
FIG. 8 is a table showing a history of conversion of an RGB signal in a highlight.

The R'G'B' signal generated by the signal correction section 10 is converted to a CMY signal by the signal conversion section 30. More specifically, the signal conversion section 30 converts the R'G'B' signal into a CMY signal, based on the above-described equations (1)-(3). FIG. 6 shows the relationship between the R'G'B' signal and the CMY signal in this case. Illustrated in FIG. 6 is a graph indicating in what manner the R'G'B' signal and the CMY signal correlate with one another. As shown in FIG. 6, in the highlight region, the range of fluctuation of the CMY signal after the conversion is small even if the R'G'B' signal greatly fluctuates.

That is, as illustrated in the present embodiment, a resultant signal value in case where the conversion to the CMY signal is carried out after the undercolor removal in the RGB color space (i.e. RGB signal→R'G'B' signal→CMY signal) is different from a resultant signal value in case where the undercolor removal is performed in the CMY color space after the conversion of the RGB signal to the CMY signal (i.e. RGB signal→CMY signal→C'M'Y' signal), as described below.

EXAMPLE

RGB Signal→R'G'B' Signal→CMY Signal

FIG. 7 illustrates a table showing a history of undercolor removal in the present embodiment. Subjected to this undercolor removal is an RGB signal in an undercolor region (where the RGB signal is higher than a highlight point (235)). FIG. 8 shows a history of the conversion of the RGB signal in the highlight region.

(Undercolor Region)

In case where an RGB signal (248, 235, 238) is supplied, the signal correction section 10 generates an R'G'B' signal in such a manner as to satisfy the above-described equations (4)-(6). As a result, the signal correction section 10 subjects the RGB signal to the undercolor removal so as to generate an R'G'B" signal (239, 235, 237) shown in FIG. 7. Thereafter, the signal conversion section 30 converts the R'G'B' signal into a CMY signal (0, 1, 0).

(Highlight Region)

An RGB signal (220, 220, 220) in a highlight region is also subjected to the process above, That is, the signal correction section 10 and the signal conversion section 30 convert the RGB signal into a CMY signal (6, 6, 6), as shown in FIG. 8.

COMPARATIVE EXAMPLE

RGB Signal→CMY Signal→C'M'Y' Signal

FIG. 9 is a table showing a history of undercolor removal of an RGB signal in an undercolor region, according to a conventional typical method. FIG. 10 is a table showing a history of conversion of the RGB signal in a highlight region, according to a conventional typical method.

(Undercolor Region)

First, a supplied RGB signal (248, 235, 238) is converted to a CMY signal (1, 4, 3). Thereafter, the undercolor removal is carried out using the CMY signal. Consequently, a C'M'Y' signal (0, 3, 2) as a result of the undercolor removal is generated as shown in FIG. 9.

(Highlight Region)

The process similar to the above is also executed against the highlight region. As shown in FIG. 10, an RGB signal (220, 220, 220) is converted to a C'M'Y' signal (6, 6, 6) as a result of the undercolor removal.

Now, the above-described example is compared with the comparative example.

As to the highlight region, the result in the example is identical with the result in the comparative example. In the meanwhile, the CMY signal (0, 1, 0) is obtained in the example, while the C'M'Y' signal (0, 3, 2) is obtained in the comparative example.

The result of the comparison indicates that the undercolor removal in the example is more accurate than the undercolor removal in the comparative example. As to the highlight region, the quality of the process is as good as the conventional method.

The following will describe the difference between scanning data (RGB signal) of a base and scanning data of a typical image.

Figure 11:
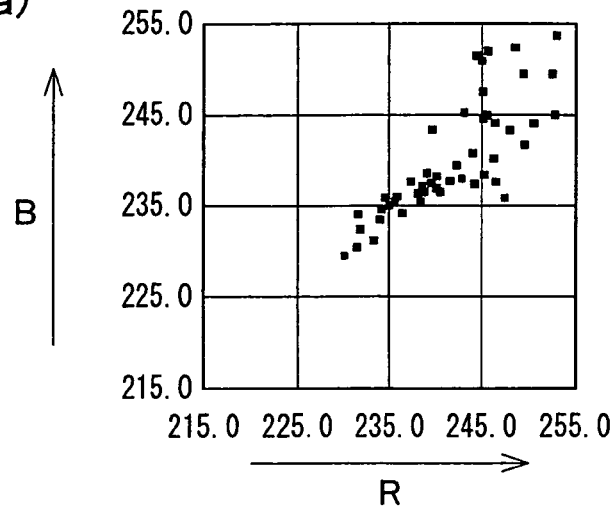
FIG. 11(a) is a graph showing scanning data of undercolor in an RB plane.
FIG. 11(b) is a graph showing scanning data of undercolor in an RG plane.
FIG. 11(c) is a graph showing scanning data of undercolor in a BG plane.
Figure 11:
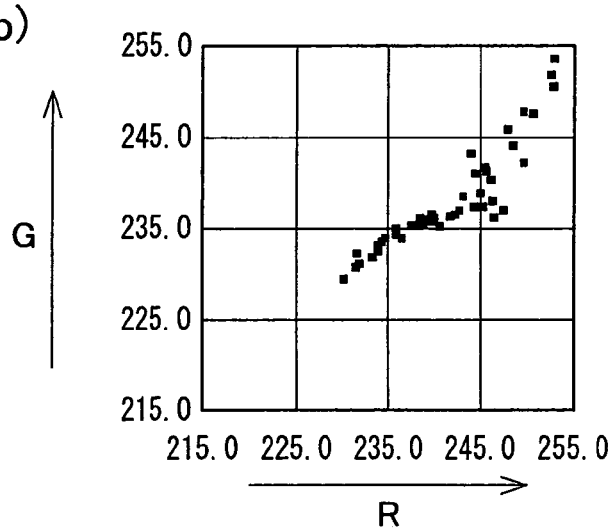
Figure 11:
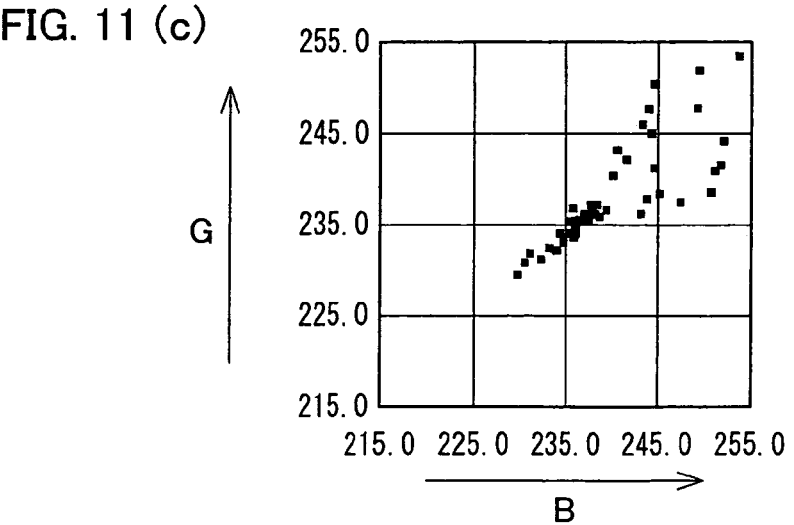

FIG. 11(*a*) is a graph showing scanning data of a base in an RB plane. FIG. 11(*b*) is a graph showing scanning data of the base in an RG plane. FIG. 11(*c*) is a graph showing scanning data of the base in a BG plane.

The base is a piece of paper (recording material) on which an image is formed. FIGS. 11(*a*)-11(*c*) therefore indicate RGB signals as a result of scanning of different types of paper by the document reading section 40.

Figure 12:
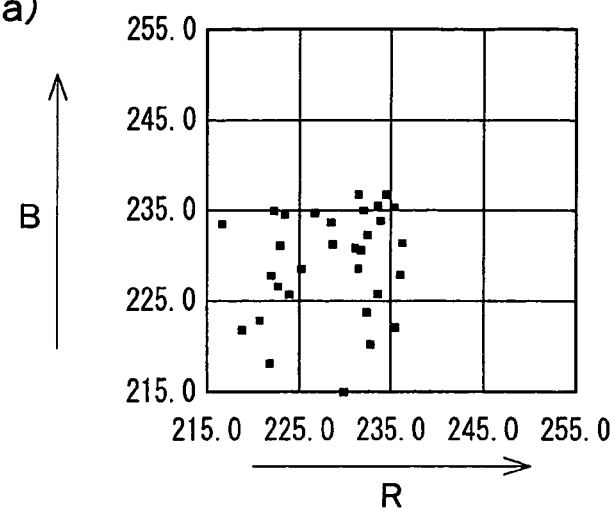
FIG. 12(a) is a graph showing scanning data of a typical image in the RB plane.
FIG. 12(b) is a graph showing scanning data of a typical image in the RG plane.
FIG. 12(c) is a graph showing scanning data of a typical image in the BG plane.
Figure 12:
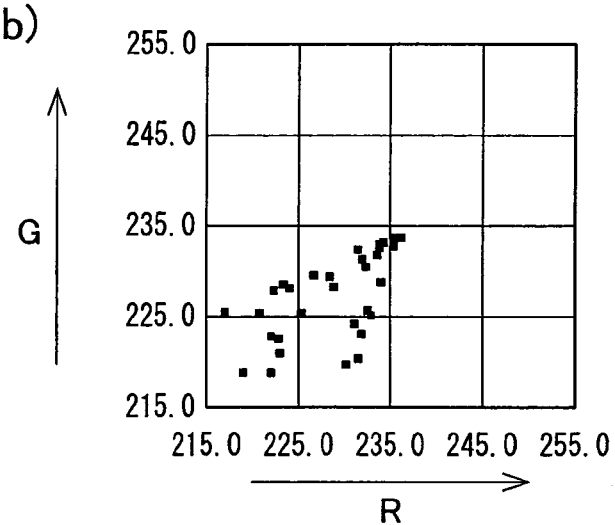
Figure 12:
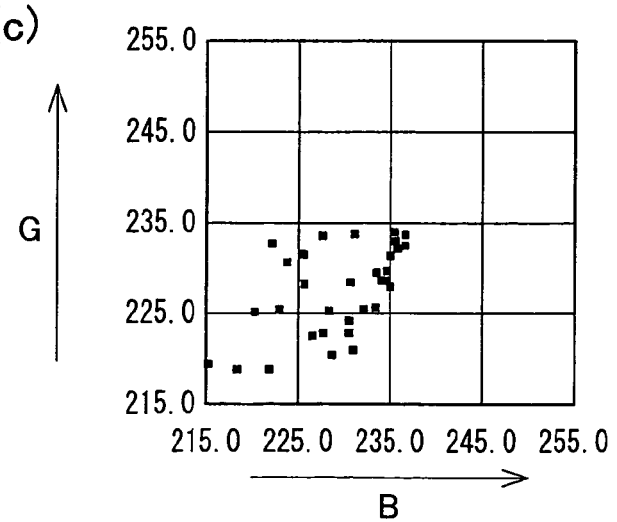

FIG. 12(*a*) is a graph showing scanning data of a typical image in an RB plane. FIG. 12(*b*) shows scanning data of the typical image in an RG plane. FIG. 12(*c*) is a graph showing scanning data of the typical image in a BG plane.

As shown in FIGS. 11(*a*)-11(*c*), in most parts of the scanning data of the base, tonal values are larger than the white point (235). As shown in FIGS. 12(*a*)-12(*c*), meanwhile, in most parts of the scanning data of the typical image, tonal values are smaller than the white point.

Taking into account of the above, a tonal value (RGB signal) which is larger than the white point is likely to indicate the base. Therefore, the undercolor removal is suitably carried out by correcting the RGB signal in such a manner as to cause the RGB signal to be close to the while point, in order to remove the influence of the base.

In case where a tonal value is smaller than the white point, the tonal value is likely to indicate image data. Therefore, the image data in the highlight is clarified by correcting the RGB signal so as to be away from the white point, to clarify the image data.

That is, the undercolor removal (aforesaid process (A)) and the clarification process (aforesaid process (B)) in the RGB color space are suitable for image processing to clarify the image data in the highlight as well as precisely carrying out the undercolor process.

The RGB signal is compared with the white point, and the undercolor process or the clarification process is carried out based on the result of the comparison. With this, the undercolor is not excessively removed and the highlight is clarified, as compared to a conventional arrangement in which undercolor removal is carried out by subtracting a predetermined tonal value from an RGB signal.

As described above, the image processing section (image processing apparatus) 41 of the present embodiment includes a signal correction section (correction means) 10 for correcting, in an RGB color space, RGB tone data which is RGB image data; and a comparison section (comparison means) 11 for comparing (i) a tonal value of a predetermined white point which is neither an origin nor maximum tonal values of R, G, and B in the RGB color space, and where tonal values of R, G, and B are identical to one another, with (ii) tonal values of R, G, B of the RGB tone data, the signal correction section 10 correcting the RGB tone data in such a manner that: (A) among the tonal values of R, G, and B, a tonal value which is determined to be larger than the tonal value of the white point is corrected to be close to the tonal value of the white point, and (B) among the tonal values of R, G, and B, a tonal value which is determined to be smaller than the tonal value of the white point is corrected to be away from the tonal value of the white point.

According to this arrangement, in case where, as a result of the comparison by the comparison section 11, the supplied RGB tone data is determined to be larger than the tonal value of the white point, the image indicated by the RGB tone data is determined to be a base. In such a case, the signal correction section 10 corrects the tonal value of the RGB tone data in such a manner as to cause the tonal value to be close to a predetermined white point, in order to carry out undercolor removal.

In case where the supplied RGB tone data is determined to be smaller than the white point as a result of the comparison by the comparison section 11, the image indicated by the RGB tone data is determined to be an image in a highlight. In such a case, the signal correction section 10 corrects the tonal value of the RGB tone data in such a manner as to cause the tonal value to be away from a predetermined white point, in order to clarify the image in the highlight.

That is, according to the arrangement above, the signal correction section 10 can perform the correction of an image in the base and the correction of an image in the highlight separately, in accordance with the result of the comparison between the tone value of the RGB tone data and the white point.

This makes it possible to improve the color reproducibility in the highlight, while fog in the base is restrained.

The image processing section (image processing apparatus of the present invention) 41 of the present embodiment may include a signal conversion section (conversion means) 30 for converting the RGB tone data, which has been corrected by the signal correction section (correction means) 10, into CMY tone data which is CMY image data.

According to this arrangement, the RGB tone data which has been corrected by the signal correction section 10 is converted into CMY tone data. As a result, CMY tone data in which the color reproducibility is improved while fog in the base is restrained is obtained.

The image processing section (the image processing apparatus of the present invention) 41 of the present embodiment is preferably arranged such that the tonal value of the white point falls within a range between 80% and 95% of the maximum tonal values of R, G, and B. When the value is 80% or lower, the dynamic range of the tone data is compressed and hence tones are degraded. When the value is 95% or higher, a margin for the scale-over of the tonal value may not be maintained, causing saturation. Therefore, in the image processing apparatus of the present invention, the white point preferably falls within the range of 0.8 Max to 0.95 Max when the tonal values of R, G, and B is in the range of 0 to Max (255). More specifically, in the image processing apparatus of the present invention, the white point may be at 235 when the tonal values of R, G, and B fall within the range of 0 to 255.

According to this arrangement, the white point is set to fall within the range of 80% to 95% of the maximum tonal values of R, G, and B. In case where the tonal values are represented in the range of 0 to 255, the white point is set at 235. This makes it possible to precisely remove the undercolor and improve the color reproducibility.

The image processing section (the image processing apparatus of the present invention) 41 of the present embodiment may further include a shading correction section (shading correction means) 40b for performing shading correction against an output from a color CCD (imaging element) 40a, when the color CCD (imaging element) 40a reads out a reference white board, the shading correction section 40b performing the shading correction in such a manner as to cause the output from the color CCD 40a to be an output set value which is smaller than the maximum tone values in the RGB color space by a predetermined value, and the signal correction section (correction means) 10 correcting the RGB tone data which has been corrected by the shading correction section (shading correction means) 40b.

According to the arrangement above, the shading correction section 40b carries out the correction in such a manner as to prevent the RGB tone data, which is supplied from the color CCD 40a at the time of reading out the reference white board, form being at a full scale (which is the maximum tonal value in the RGB color space). With this, for example, it is possible to avoid the saturation on account of the scale-over of the output from the color CCD 40a, which occurs because of the whiteness of the document base (the document base whiter than the reference white board), noise, fluorescent ink, or the like. For this reason, the reproducibility in a highlight (highlight region) is ensured.

The image processing section (image processing apparatus of the present invention) 41 of the present embodiment may be arranged such that the output set value is identical with the tonal value of the white point.

A color photocopier (the image forming apparatus of the present invention) 1 of the present embodiment includes the image processing section (the image processing apparatus of the present invention) 41. This makes it possible to form an image in which the color reproducibility in a highlight is improved while fog in the base is restrained.

The descriptions above relate to a method of obtaining an RGB signal from the color CCD 40a in the document reading section 40. In this case, the output value of the color CCD 40a is preferably corrected in such a manner that an output set value is arranged so that the maximum output of an RGB signal at the time of the correction of the RGB tone data is smaller than the full scale by a predetermined value.

More specifically, the color CCD 40a generates an RGB signal, and this RGB signal is subjected to shading correction in the shading correction section 40b, using a reference white board. After the shading correction, the output value (RGB signal) of the shading correction section 40b is more preferably corrected in such a manner that the maximum value of the output of the color CCD 40a, which is supplied from the shading correction section 40b, is smaller than the full scale by a predetermined value.

It is more preferable that the output set value is identical with the white point (i.e. the output set value is at 235 in the present embodiment).

In the descriptions above, the signal correction section 10 carries out correction in reference to the LUT 21. The conversion of the RGB signal to an R'G'B' signal, however, is not necessarily carried out in the manner as above. For example, the conversion may be carried out using a function. More specifically, the R'G'B' signal may be worked out from the supplied RGB signal, based on an equation for correction, which is shown in FIG. 4.

The image processing section 41 of the present embodiment may include a signal correction section 10 for correcting, in an RGB color space, RGB tone data which is RGB image data; and a comparison section 11 for comparing (i) a tonal value of a predetermined white point which is neither an origin nor maximum tonal values of R, G, and B in the RGB color space, and where tonal values of R, G, and B are identical to one another, with (ii) tonal values of R, G, B of the RGB tone data, the signal correction section 10 correcting the RGB tone data in such a manner that: (A) when the tonal values of R, G, and B of the RGB tone data are determined to be larger than the white point, the tonal values of R, G, and B of the RGB tone data are corrected to be close to the white point, (B) when the tonal values of R, G, and B of the RGB tone data are determined to be smaller than the white point, the tonal values of R, G, and B of the RGB tone data are corrected to be away from the white point, and (C) when the tonal values of R, G, and B of the RGB tone data are determined to be identical with the white point, the tonal values of R, G, and B of the RGB tone data are not corrected.

The respective blocks in the image processing section 41, the input process section 41b in particular, may be realized by hardware logic. Alternatively, the blocks may be realized by software, with the use of a CPU as follows.

That is, the image processing section 41 may include members such as: a CPU (Central Processing Unit) that executes instructions of a control program realizing the functions; a ROM (Read Only Memory) recording the program; a RAM (Random Access Memory) on which the program is executed; and a storage device (Recording Medium) such as a memory, which stores the program and various kinds of data. The objective of the present invention can be achieved in the following manner: program code (e.g. an executable code program, intermediate code program, and source program) of the control program of the image processing section 41, the control program being software for realizing the functions, is recorded on a recording medium in a computer-readable manner, this recording medium is supplied to the image processing section 41, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc, such as a CD-ROM/MO/MD/DVD/CD-R; a card, such as an IC card (inclusive of a memory card); and a semiconductor memory, such as a mask ROM, an EPROM (erasable programmable read only memory), an EEPROM (electrically erasable programmable read only memory), or a flash ROM.

Alternatively, the image processing section 41 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

The image processing apparatus of the present invention can be used for undercolor removal using an RGB signal. In particular, the image processing apparatus of the present invention is preferably used for the correction of an RGB signal generated by an imaging element such as CCD.

The present invention is not limited to the description of the embodiments above, but may be altered by a skilled person within the scope of the claims. An embodiment based on a proper combination of technical means disclosed in different embodiments is encompassed in the technical scope of the present invention.

What is claimed is:

1. An image processing apparatus, comprising:
   correction means for correcting, in an RGB color space, RGB tone data which is RGB image data; and
   comparison means for comparing (i) tonal values of R, G, and B at a white point which is a point set in advance in the RGB color space, with (ii) tonal values of R, G, and B of the RGB tone data, respectively,
   the white point being a point in the RGB color space which point is neither an origin nor a point indicating respective maximum tonal values of R, G, and B and at which point the tonal values of R, G, and B are identical to one another,
   the correction means correcting the RGB tone data in such a manner that:
   (A) among the tonal values of R, G, and B of the RGB tone data, a tonal value which is determined by the comparison means to be larger than a corresponding tonal value at the white point is corrected so that a difference between the tonal value of the RGB tone data and the corresponding tonal value at the white point is smaller, and
   (B) among the tonal values of R, G, and B of the RGB tone data, a tonal value which is determined by the comparison means to be smaller than a corresponding tonal value at the white point is corrected so that a difference between the tonal value of the RGB tone data and the corresponding tonal value at the white point is larger.

2. An image processing apparatus as defined in claim 1, further comprising conversion means for converting the RGB tone data, which has been corrected by the correction means, into CMY tone data which is CMY image data.

3. The image processing apparatus as defined in claim 1, wherein, the tonal value of R, G, and B at the white point falls within a range between 80% and 95% of the maximum tonal values of R, G, and B in the RGB color space, respectively.

4. The image processing apparatus as defined in claim 1, further comprising shading correction means for performing shading correction against an output from an imaging element,
   the shading correction means performing the shading correction in such a manner as to cause the output from the imaging means to be an output set value which is smaller than the maximum tone values in the RGB color space by a predetermined value, and
   the correction means correcting the RGB tone data which has been corrected by the shading correction means.

5. The image processing apparatus as defined in claim 4, wherein, the output set value is identical with the tonal values at the white point.

6. The image processing apparatus as defined in claim 1, wherein, the correction means also corrects the RGB tone data in such a manner that (C) among the tonal values of R, G, and B, a tonal value which is determined by the comparison means to be identical with a corresponding tonal value at the white point is not corrected.

7. The image processing apparatus as defined in claim 1, wherein, the correction means corrects the RGB tone data, based on data indicating correlation between the tonal values of R, G, and B before correction and the tonal values of R, G, and B after the correction, respectively.

8. The image processing apparatus as defined in claim 1, wherein, the correction means corrects the RGB tone data, based on a conversion function which is used for converting the tonal values of R, G, and B before correction into the tonal values of R, G, and B after the correction, respectively.

9. A method for controlling an image processing apparatus, comprising the steps of:

(I) correcting, in an RGB color space, RGB tone data which is RGB image data; and (II) comparing (i) tonal values of R, G, and B at a white point which is a point set in advance in the RGB color space, with (ii) tonal values of R, G, and B of the RGB tone data, respectfully, the white point being a point in the RGB color space which point is neither an origin nor a point indicating respective maximum tonal values of R, G, and B and at which point the tonal values of R, G, and B are identical to one another, in the step (II), the RGB tone data being corrected in such a manner that:

(A) among the tonal values of R, G, and B of the RGB tone data, a tonal value which is determined in the step (I) to be larger than a corresponding tonal value at the white point is corrected so that a difference between the tonal value of the RGB tone data and the corresponding tonal value at the white point is smaller, and (B) among the tonal values of R, G, and B of the RGB tone data, a tonal value which is determined in the step (I) to be smaller than a corresponding tonal value at the white point is corrected so that a difference between the tonal value of the RGB tone data and the corresponding tonal value at the white point is larger.

10. An image forming apparatus, comprising the image processing apparatus defined in claim 1.

11. A computer-readable medium storing a control program for operating the image processing apparatus defined in claim 1, the control program, when executed, causing a computer to function as the respective means of the image processing apparatus.

* * * * *